(12) United States Patent
Evans et al.

(10) Patent No.: US 7,379,255 B2
(45) Date of Patent: May 27, 2008

(54) DATA STRUCTURE, DATA STORAGE APPARATUS AND METHOD

(75) Inventors: Nigel Ronald Evans, Bristol (GB); Andrew Malcolm George Clarke, Bristol (GB); John Mark Mackelden, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 11/332,934

(22) Filed: Jan. 17, 2006

(65) Prior Publication Data
US 2006/0176598 A1    Aug. 10, 2006

(30) Foreign Application Priority Data
Jan. 21, 2005  (GB) ................. 0501243.0

(51) Int. Cl.
*G11B 5/09*   (2006.01)
(52) U.S. Cl. ............................................. 360/48
(58) Field of Classification Search ............. None
See application file for complete search history.

(56) References Cited

U.S. PATENT DOCUMENTS 5,029,022 A * 7/1991 Odaka et al. .............. 360/48
5,081,548 A * 1/1992 Inazawa et al. ........... 360/72.2
5,287,478 A * 2/1994 Johnston et al. ........... 711/111
5,367,410 A * 11/1994 McCarthy .................. 360/48
5,379,152 A * 1/1995 Odaka et al. .............. 360/48
5,862,008 A * 1/1999 Yamada et al. ............ 360/69
6,172,829 B1 * 1/2001 Ozaki et al. ............... 360/48
6,493,166 B1 * 12/2002 Takayama .................. 360/69
6,624,959 B1 * 9/2003 Takayama .................. 360/69
6,625,732 B1   9/2003 Weirauch et al.

FOREIGN PATENT DOCUMENTS

WO    WO 93/10534    5/1993

* cited by examiner

*Primary Examiner*—K. Wong

(57) ABSTRACT

Data stored on a tape in a plurality of data recording sessions employs tape drive apparatus programmed to record the data in accordance with a format specifying a log of tape-usage information. The log is in the form of a data structure including a plurality of log sections in which tape usage information is recorded relating respectively to corresponding ones of the plurality of data recording sessions. The log sections together constitute a cumulative record of tape usage covering the corresponding plurality of recording sessions, each log section in respect of a recording session comprising an identifier of the tape drive apparatus used for that recording session and a count of the recording session.

20 Claims, 4 Drawing Sheets

DATA STRUCTURE, DATA STORAGE APPARATUS AND METHOD

FIELD OF THE INVENTION

The present invention relates to storing data on a tape in accordance with a format in which tape usage information is logged on the tape.

BACKGROUND OF THE INVENTION

It is known to provide the storage and retrieval of digital information on magnetic tape in a format that is referred to as the DDS format which has developed through a number of versions. In a DDS tape drive, a magnetic tape cassette is loaded into the tape drive and the tape in the cassette is transported past a rotary head drum to record overlapping oblique tracks across the tape. The DDS format provides for a number of specific areas on the tape including a device area for loading and testing the tape, a system area that includes a tape log and a data area for recording user data. The tape log is provided to record tape-usage information. The tape log is read when a tape cassette is loaded into the tape drive and the tape log is updated by being overwritten when the tape cassette is unloaded.

If problems occur during an update of the tape log, due to a head clog or a power cycle failure, then the log can be corrupted rendering it useless on subsequent tape loading operations. In addition, if the tape drive has had problems in writing data to the tape, it may be considered too risky to attempt an update of the tape log for fear of corrupting the log. In this case the cassette may be ejected without the current tape usage information being added to the log.

U.S. Pat. No. 5,576,903 describes a helical scan tape drive that reads and writes a stream of data records received from a host processor, in stripes on a magnetic tape. Apparatus operationally independent of the host processor provides administrative data relating to the data records written on the magnetic tape. The administrative information is written in a header segment of the magnetic tape located before the data records. The administrative information includes tape usage statistics, an identification of the tape drives on which the tape was mounted, a record of the number of read/write errors detected and corrected and a collection of error statistics.

SUMMARY OF THE INVENTION

According to the present invention, there is now provided a data structure for a tape log recorded on a tape, the data structure including a plurality of log sections in which tape usage information is recorded relating respectively to a corresponding plurality of data recording sessions, the log sections together constituting a cumulative record of tape usage covering the corresponding plurality of recording sessions, each log section in respect of a recording session comprising an identifier of tape drive apparatus used for that recording session and a count of the recording session.

Further according to the present invention, there is provided a method of storing data on a tape in a plurality of data recording sessions employing tape drive apparatus programmed to record the data in accordance with a format specifying a log of tape-usage information, the method comprising recording the log in the form of a data structure including a plurality of log sections in which tape usage information is recorded relating respectively to corresponding ones of the plurality of data recording sessions, the log sections together constituting a cumulative record of tape usage covering the corresponding plurality of recording sessions, each log section in respect of a recording session comprising an identifier of the tape drive apparatus used for that recording session and a count of the recording session.

Yet further according to the present invention, there is provided data storage apparatus to record data on a tape, the apparatus being programmed to record the data in accordance with a format specifying a log of tape-usage information, the log having a data structure including a plurality of log sections in which tape usage information is recorded relating respectively to corresponding ones of a plurality of data recording sessions, the log sections together constituting a cumulative record of tape usage covering the corresponding plurality of recording sessions, each log section in respect of a recording session comprising an identifier of the tape drive apparatus used for that recording session and a count of the recording session.

DESCRIPTION OF THE DRAWINGS

The invention will now be described, by way of example only, by reference to the accompanying drawings in which.

DETAILED DESCRIPTION OF THE INVENTION

Figure 1:
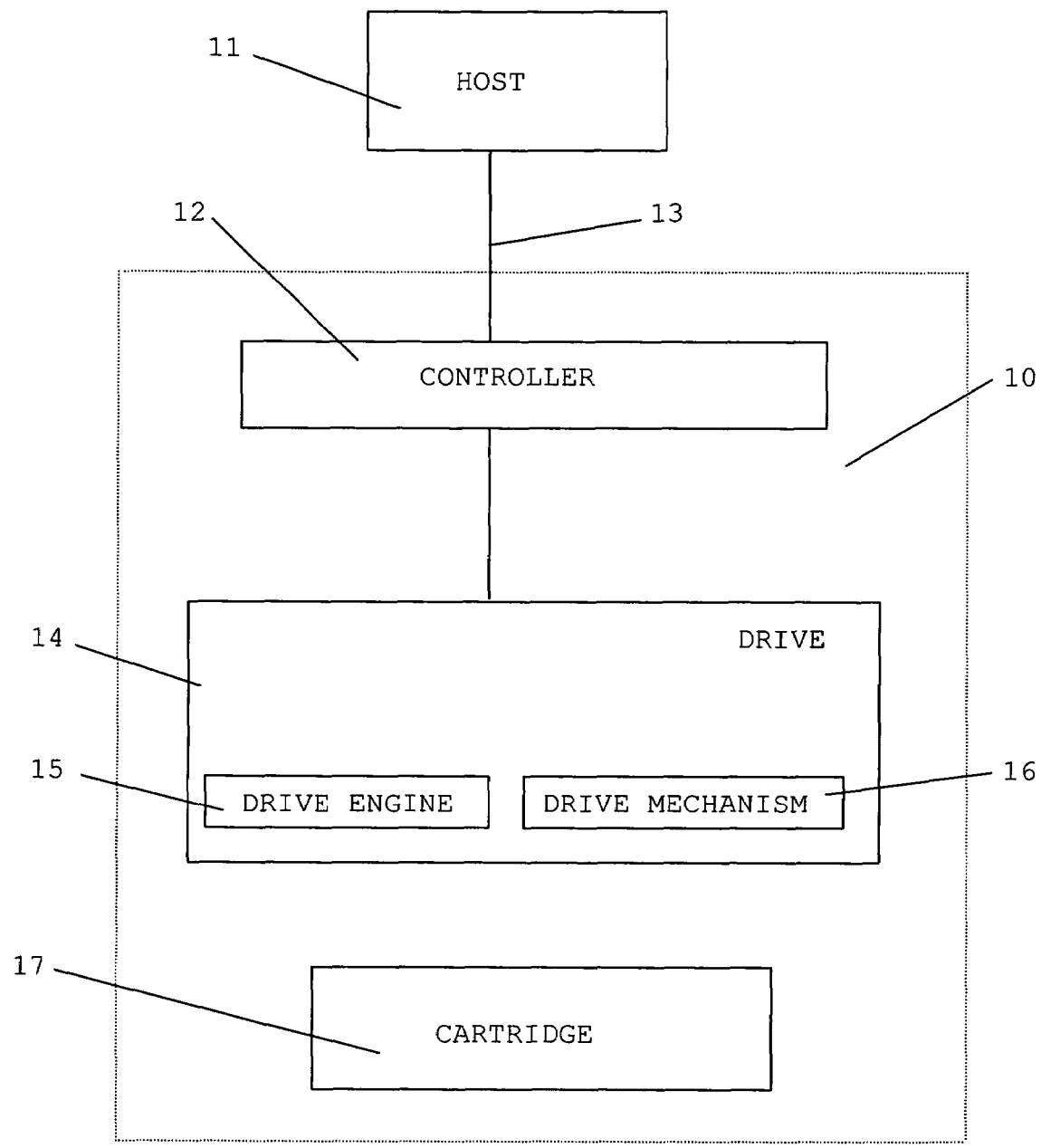
FIG. 1 shows a block diagram of the components of a magnetic tape recording system embodying the present invention.

Referring to FIG. 1, there is shown a data storage system 10 embodying the present invention. The system includes a host 11 coupled to a controller 12 via an interface 13. The controller 12 is programmed to control a tape drive 14 that includes a drive engine 15 and a drive mechanism 16. The drive mechanism is adapted to receive a tape cartridge 17. A controlling software application on the host 11 controls the reading and writing of data on a magnetic data tape in the tape cartridge 17.

The host system 11 has at least one central processing unit (CPU) and a memory to store the controlling software application. The interface 13 connecting the host system 11 to the controller 12 may be any suitable proprietary standard bus known to those skilled in the art.

The drive mechanism 16 includes electrical and mechanical components that receive, position and access tape cartridges. The drive mechanism has components to lock a tape cartridge in place, an ejection motor and read/write heads. The drive engine 15 is a data processor that is programmed to supervise the operations of the drive mechanism 16 and to manage the flow of data to be recorded in or read from a tape cartridge 17 received in the drive 14.

Figure 2:
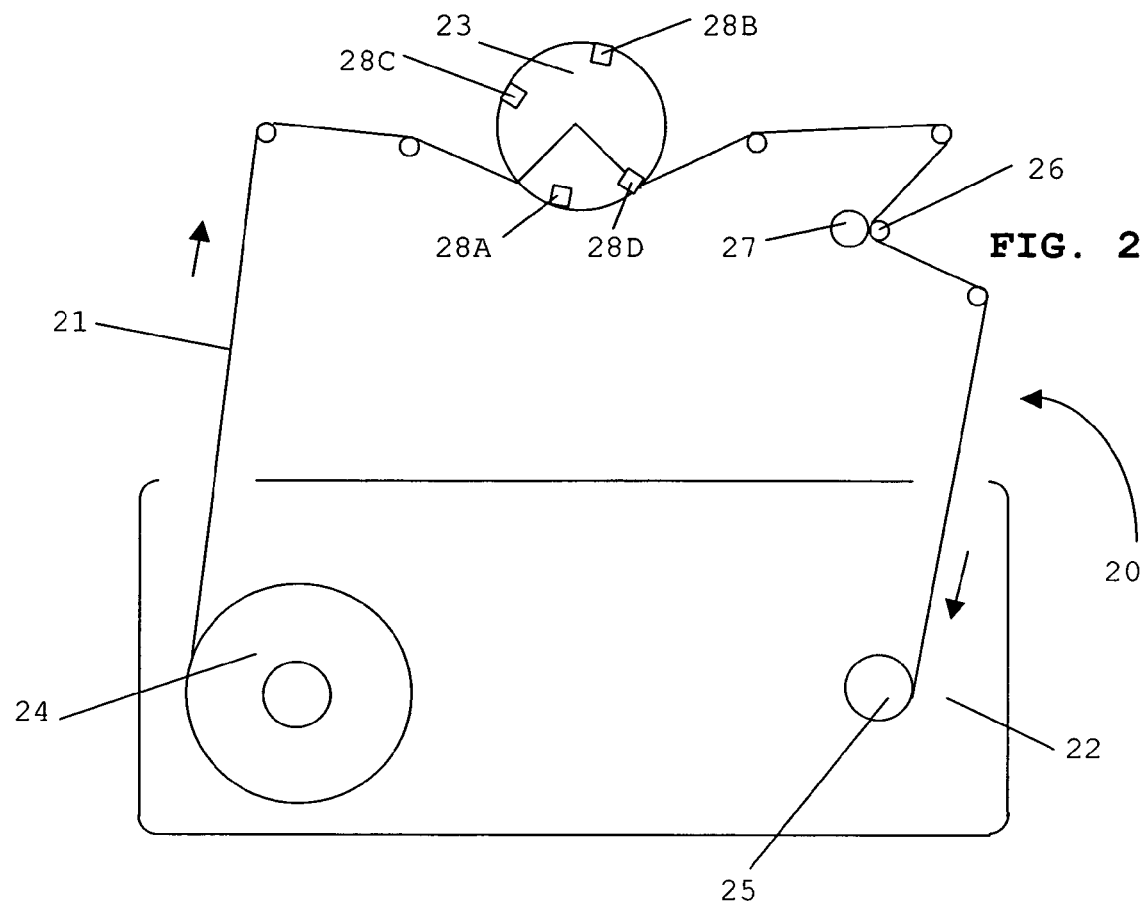
FIG. 2 shows the main physical components of a tape deck included in the system of FIG. 1.
Figure 3:
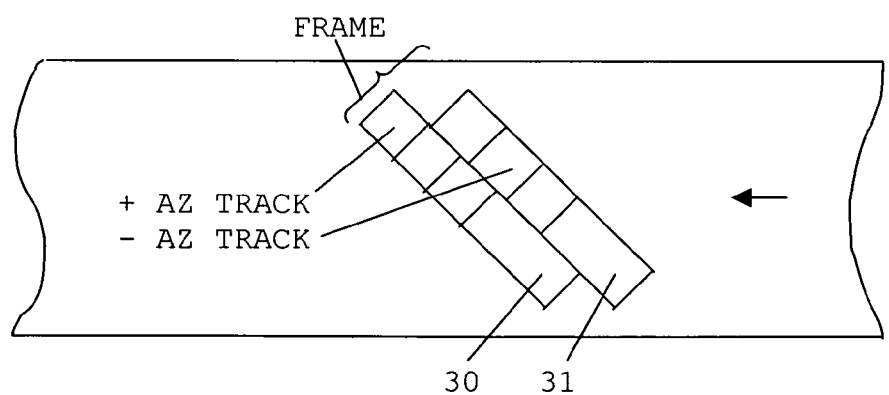
FIG. 3 is a diagrammatic representation of two data tracks recorded on a tape by means of the tape deck of FIG. 2, FIGS. 4, 5 and 6 are diagrams showing the data layout of a tape recorded in accordance with the present invention.

Referring to FIG. 2, there is shown the basic layout of the tape drive 14 which is in the form of a helical-scan tape deck 20 in which tape 21 from a tape cartridge 22 passes at an angle across a rotary head drum 23. The tape is driven in the direction indicated by the arrows from a motor driven supply reel 24 to a motor driven take up reel 25. A capstan 26 and pinch roller 27 control the passage of the tape past the head drum 23. The rotary head drum 23 carries two magnetic write heads 28A and 28B spaced apart by 180° and two read heads 28C and 28D also spaced apart by 180°. The heads 28A and 28B are arranged to write a succession of overlapping oblique data tracks 30, 31 on the tape as shown in FIG. 3. The two tracks 30, 31 are representative of a succession of tracks along the tape that are recorded according to a DDS format. The track written by the head 28A has a positive azimuth while the track written by the head 28B has a negative azimuth. Each pair of positive and negative azimuth tracks 30,31 constitutes a frame.

Figure 4:
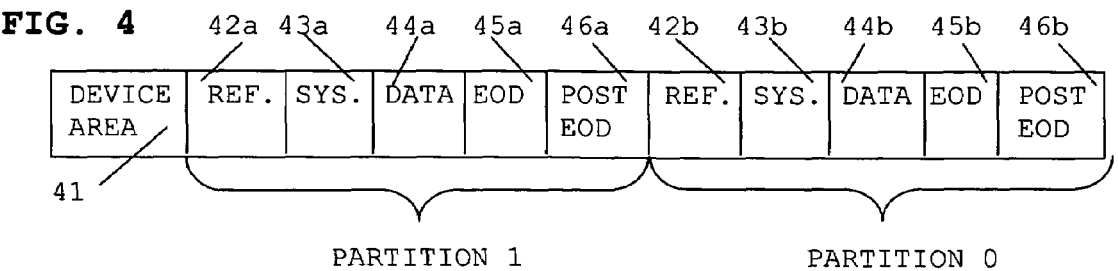

The tape 21 may formatted so as to have a single space for data or may be formatted as a partitioned tape in which data may be recorded in one partition independently of data recorded in another partition on the tape. The present invention may be applied to either a single data space tape or a partitioned tape but for convenience will be described in relation to a partitioned tape. FIG. 4 shows the overall layout of the tape 21 when it is formatted as a two-partition tape. The two partitions are referred to as partition 1 and partition 0, the partition 0 being, by convention, the furthest from the start of the tape 21. In addition to the partitions themselves, there is an initial area 41 of the tape that is referred to as a device area that is used in the initial setting up of the tape 21.

The layout of partition 1 of the tape 21 consists of 5 areas that comprise a reference area 42a, a system area 43a, a data area 44a, an end of data area 45a and a post end of data area 46a. The partition 0 also has a reference area 42b, a system area 43b, a data area 44b, an end of data area 45b and a post end of data area 46b.

The reference areas 42a and 42b are each used as a physical reference. The system area 43a of partition 1 includes a system log that is updated by being overwritten as will be described more fully below. The system area 43b of partition 0 does not include a system log but has system frames that are written as a continuum upon tape format and are not overwritten until the next tape format. The data areas 44a and 44b are used for recording user data and are followed by the end of data areas 45a and 45b and the post end of data areas 46a and 46b.

Figure 5:
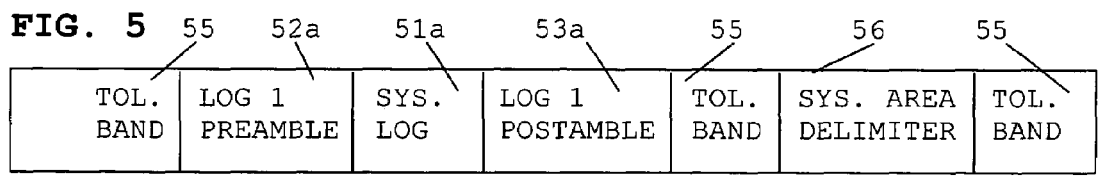

FIG. 5 shows the layout of the system log 51a in the system area 43a of the tape 21. The system log 1 is preceded by a preamble 52a and followed by a postamble 53a. Position tolerance bands 55 are provided to accommodate positioning tolerances when updating the system log. A system area delimiter 56 is used as a physical reference.

Figure 6:
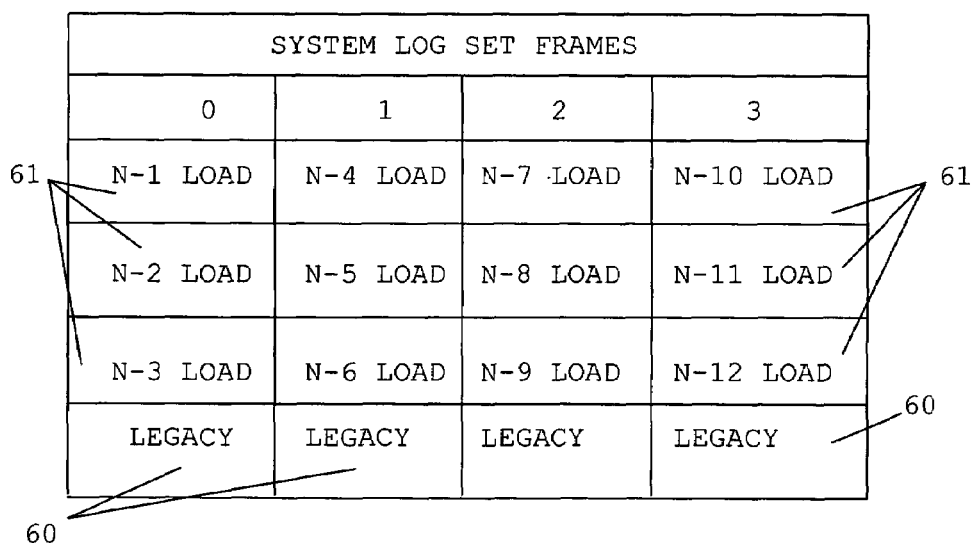

The system log comprises four consecutive log set frames 0, 1, 2 and 3 constituting a system log set. The system log set is divided into sixteen log sections of information to form a data structure as shown in FIG. 6. Each frame in the system log set contains a legacy log section 60 and three extended log sections 61. The legacy log sections 60 of the system log contain the basic information that is required to make the system log compatible with tape drives programmed to run versions of the DDS format that do not cater for the information in the extended log sections 61. This basic information comprises two counts. A first of the two counts covers the total number of user data groups read or written and the total number of errors in writing or reading since the last format of the tape. The second of the two counts covers the number of user data groups read or written and the number of errors in writing or reading in the previous load session.

Each extended log section 61 of the system log contains information pertinent to the state of the drive that wrote the system log between 1 and 12 loads previously, the sections being numbered accordingly in FIG. 6 from N-12 representing the earliest of the 12 loads to N-1 representing the latest of the 12 loads. The information in each log section 61 includes an identifier of the tape drive on which the tape was loaded for a data recording session and a load count, the load counts of the 12 sections running from N-12 to N-1. The 12 extended log sections together constitute a cumulative record of tape usage covering the corresponding previous 12 recording sessions. Each extended log section also includes capacity to store the identity of eight standard tape alert flags set during a tape load session and for information that can be specified by the vendor of the tape drive.

The tape logs are constructed entirely within sub-code information thereby ensuring that the structure of the system log does not jeopardise the implementation of any proprietary use of the data region of the tape log. The sub-code information in the sixteen sections of the system log is distributed between four frames constituting the system log set shown in FIG. 6 and the system log set is repeated twenty times to ensure that the tape drive on which the tape 21 is loaded can read every unique part of the sub-code information while pulling the tape 21 at high speed in a manner to be described. Each individual section of the extended log sections 61 includes a cyclic redundancy check (CRC) character to enable the contents of that section of the log to be individually validated. Furthermore, since each individual extended log section 61 includes a load count, a check that the information in the 12 extended log sections is correctly ordered can easily be made.

Figure 7:
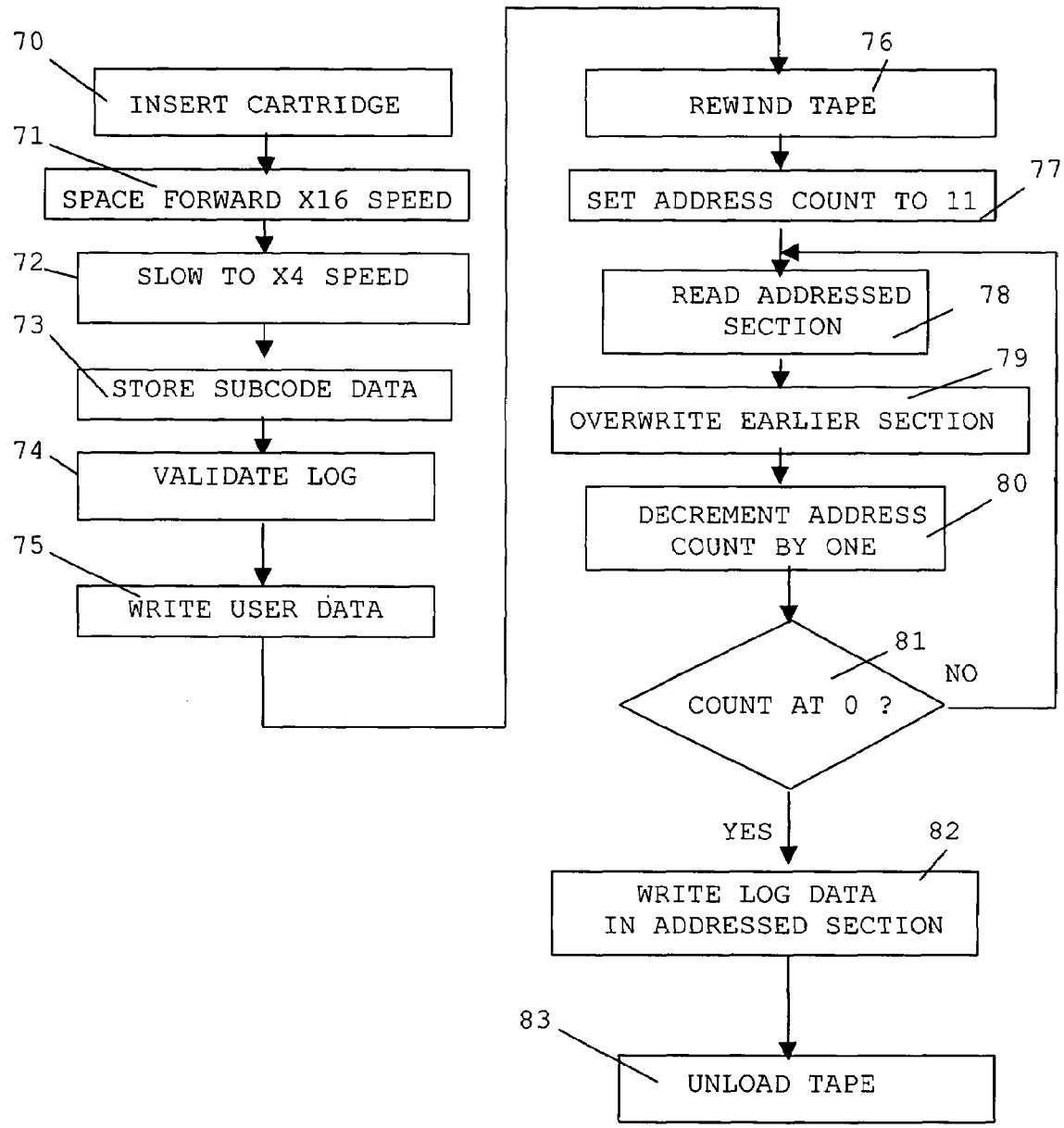
FIG. 7 is a flow diagram of steps to update a system log on the tape of FIGS. 4, 5 and 6.

Referring now to FIG. 7, the tape cartridge is loaded in step 70 and the tape is advanced forward in step 71 at 16 times the normal speed. In step 72 the tape is slowed to 4 times normal speed in position to read the sub-code data in the system log area of the tape. In step 73, the sub-code data is stored in the drive engine 15 of the tape drive and the process continues to step 74 where the system log is validated. The process of validating the system log is effected from the CRC characters read into the drive engine 15 from the extended log sections 61 and by checking the order of the load counts read from the extended log sections 61. Following validation of the log, the tape is moved forward to write user data frames in step 75.

When the tape is due to be unloaded following the recording of user data, the drive engine 15 causes the tape to be rewound in step 76. The drive engine calculates and stores the log values and the CRC in respect of the current tape load. The process moves to step 77 where the drive engine 15 sets a log address count to an initial count value of 11. On a first pass through step 78, the initial address count value points to the extended log section 61 with a load count value of N-11 and the log data in the addressed log section is read. In step 79, the data read in step 78 is used to overwrite the log section having the next higher load count, i.e. in the first pass through step 79, the data from the log section having a load count of N-11 is used to overwrite the log section having a load count value of N-12. In step 80 the log address count is decremented by one and in step 81 a check is made to determine whether the log address count has reached 0. If not, the process returns to step 78 and a second pass is made through the steps 78, 79, 80 and 81 using the decremented address count. On the second pass, the data from the log section 61 having a load count of N-10 is used to overwrite the log section having a load count value of N-11. The process including the steps 78, 79, 80 and 81 is repeated and continues until the log access count has decremented at each pass until it reaches an address count of 0 at which point the data in the log sections having count values of N-2 to N-12 will have been overwritten by the data read from the log sections having the load count values of N-1 to N-11 respectively. Then the process moves to step 82 in which the stored log values and the CRC in respect of the current tape load are written in the extended log section having the load count of N-1. The tape is then unloaded in step 83.

What has been described is a data structure for a tape log recorded on a tape, the data structure including a plurality of log sections in which tape usage information is recorded to constitute a cumulative record of tape usage covering a plurality of loads of the tape, each log section in respect of a tape load comprising an identifier of the tape drive apparatus used for that tape load and a count of the tape load.

The data structure may, with advantage, be applied to generate a robust and extensible, multi-load usage log within the DDS format, which ensures media interchange and yet does not preclude or interfere with any proprietary use of the data region of the tape log. This application of the data structure is achieved through the combination of CRC protection, and the encapsulation of key media usage information and vendor reserved fields entirely within sub-code data of the format.

The invention claimed is:

1. A data structure for a tape log recorded on a tape, the data structure including:
a plurality of log sections for the tape log in which tape usage information is recorded relating respectively to a corresponding plurality of data recording sessions, the log sections together constituting:
a cumulative record of tape usage covering the corresponding plurality of recording sessions, each log section in respect of a recording session comprising:
an identifier of tape drive apparatus used for that recording session; and
a count of the recording session.

2. A data structure as claimed in claim 1, wherein the log sections each include a respective cyclic redundancy check character.

3. A data structure according to claim 2, wherein the log sections are each individually verifiable from the respective cyclic redundancy check character.

4. A data structure as claimed in claim 1, wherein the log sections number 12.

5. A data structure as claimed in claim 1, wherein the log sections are structured in the order of their counts of the data recording sessions.

6. A data structure as claimed in claim 1, wherein the log sections are recorded entirely within sub-code information.

7. A method of storing data on a tape in a plurality of data recording sessions employing tape drive apparatus configured to record the data in accordance with a format specifying a log of tape-usage information, the method comprising:
recording the log in the form of a data structure including a plurality of log sections in which tape usage information is recorded relating respectively to corresponding ones of the plurality of data recording sessions, the log sections together constituting:
a cumulative record of tape usage covering the corresponding plurality of recording sessions, each log section in respect of a recording session comprising:
an identifier of the tape drive apparatus used for that recording session; and
a count of the recording session.

8. A method as claimed in claim 7, wherein the log sections each include a respective cyclic redundancy check character.

9. A method as claimed in claim 8, wherein the log sections are each individually verifiable from the respective cyclic redundancy character.

10. A method as claimed in claim 7, wherein the log sections number 12.

11. A method as claimed in claim 7, wherein the log sections are structured in the order of their counts of the data recording sessions.

12. A method as claimed in claim 11, wherein each log section except the first in the said order is overwritten with the information of the log section that precedes it in the said order.

13. Data storage apparatus to record data on a tape, the apparatus being configured to record the data in accordance with a format specifying a log of tape-usage information, the log having a data structure including a plurality of log sections in which tape usage information is recorded relating respectively to corresponding ones of a plurality of data recording sessions, the log sections together constituting a cumulative record of tape usage covering the corresponding plurality of recording sessions, each log section in respect of a recording session comprising an identifier of the tape drive apparatus used for that recording session and a count of the recording session.

14. Apparatus as claimed in claim 13, wherein the log sections each include a cyclic redundancy check character.

15. Apparatus as claimed in claim 14, wherein the log sections are each individually verifiable from the respective cyclic redundancy character.

16. Apparatus as claimed in claim 13, wherein the log sections number 12.

17. Apparatus as claimed in any one of claim 13, wherein the log sections are structured in the order of their counts of the data recording sessions.

18. Apparatus as claimed in claim 17, configured to overwrite each log section except the first in the said order with the information of the log section that precedes it in the said order.

19. Apparatus as claimed in claim 18, configured to record the tape usage information relating to the most recent of the data recording sessions in the said first log section.

20. Apparatus as claimed in claim 7, configured to record the log sections entirely within sub-code information.

* * * * *